Patented Jan. 14, 1947

2,414,330

UNITED STATES PATENT OFFICE 2,414,330

TRIFLUOROMETHYL DERIVATIVES OF VINYL AROMATIC COMPOUNDS

Mary W. Renoll, Dayton, Ohio, assignor to Monsanto Chemical Company, St. Louis, Mo., a corporation of Delaware No Drawing. Application April 15, 1944, Serial No. 531,283

10 Claims. (Cl. 260—74)

The present invention relates to nuclear (trifluoro)-methyl derivatives of vinyl aromatic compounds, more particularly to (trifluoromethyl) styrenes, and to a method of producing the same.

An object of the present invention is the production of nuclear (trifluoro) methyl derivatives of vinyl aromatic compounds. Another object of the invention is the preparation of (trifluoromethyl) styrenes. A further object is the provision of new polymerizable monomers for the plastics and coatings industries. Still another object of the invention is the provision of new polymeric and copolymeric resinous materials.

These and other objects which will be hereinafter disclosed are provided by the following invention wherein there are prepared new (trifluoro) methyl derivatives of vinyl aromatic compounds having the following formula:

$$CH_2:CH.Ar.CF_3$$

wherein Ar is an aromatic hydrocarbon radical. As examples of compounds having the above structure may be mentioned meta-(trifluoromethyl) styrene, ortho-(trifluoromethyl) styrene, para-(trifluoromethyl) styrene, 1-(trifluoromethyl)-3-vinylnaphthalene, 1-(trifluoromethyl)-4-vinylnaphthalene, 1-(trifluoromethyl)-2-vinylnaphthalene, 4-(trifluoromethyl)-4'-vinylbiphenyl, etc.

Compounds having the above general formula are readily obtainable by reaction of nuclearly trifluoromethylated aryl magnesium halides with acetaldehyde to yield trifluoromethylated aryl methyl carbinols and dehydration of the latter to give the corresponding trifluoromethylated vinyl aromatic compounds, substantially according to the following series of reactions:

$$XMg.Ar.CF_3 \xrightarrow{CH_3CHO}$$

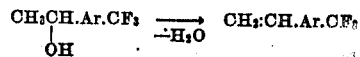

wherein X represents halogen and Ar is an aromatic hydrocarbon radical.

My new, nuclearly trifluoromethylated vinyl aromatic compounds range from clear, limpid to rather viscous liquids, depending upon the nature of the aromatic radical. They are pleasant smelling liquids which retain their fluorine content under ordinary atmospheric conditions and also when heated to high temperatures. Upon standing either at ordinary or increased temperatures, in the presence or absence of catalysts, they polymerize to give clear, hard, transparent resinous materials that are characterized by a high degree of thermal stability. They readily undergo copolymerization with other unsaturated materials, for example, styrene or butadiene to give resinous or rubbery copolymers possessing unusual properties, the preparation of the rubbery copolymers being the subject of my copending application, Serial No. 531,284, filed April 15, 1944, assigned to the same assignee as the present application.

While I am aware of the previous preparation of other fluorine derivatives of vinyl aromatic hydrocarbons wherein the fluorine is contained in an aliphatic substituent, for example, the beta-fluorostyrene reported by Swarts (Bull. soc. chim. (4) 25, 152), the present trifluoromethylated vinyl aromatic compounds differ essentially from the Swarts compound in that they contain three atoms of very stable, bound fluorine, the fluorine being present in the vinyl aromatic compounds in such a manner as to facilitate, rather than hinder, polymerization. Since chain-substitution in styrene is known to detract from polymerizing ability, the beta-fluorostyrene of Swarts is of comparatively little value in the preparation of resinous or rubbery materials. The discovery that the (trifluoromethyl) group when included in a vinyl aromatic nucleus has an accelerating effect on polymerization was unexpected.

In preparing by new, trifluoromethylated vinyl aromatic compounds I proceed substantially as follows: I prepare a Grignard reagent, for example, substantially according to the procedure described by Simons and Ramler (J. Am. Chem. Soc. 65, 389 (1943)) for the preparation of meta-trifluoromethylphenylmagnesium bromide, i. e., by reaction of a unclearly halogenated, nuclearly trifluoromethylated aromatic hydrocarbon with magnesium in dry ether. I then slowly add acetaldehyde to the Grignard reagent, preferably with vigorous stirring and at low temperatures in order to prevent volatilization of the aldehyde. Temperatures of from —10° C. to 20° C. are advantageously employed, and preferably temperatures of from, say —5° C. to 5° C., but the condensation may be effected at increased temperature if an excess of solvent or suspending agent be employed and the acetaldehyde is introduced into the reaction vessel in the vapor state.

The reaction of the Grignard reagent with acetaldehyde, especially when employing the low temperatures noted above, takes place smoothly and in good yields, which fact is surprising in view of the slight reactivity of meta-trifluoromethylphenylmagnesium bromide with dimethyl sulfate (for the preparation of meta-methylbenzotrifluoride) as reported by Simons and Ramler in the article referred to above.

The trifluoromethyl aryl methyl carbinols thus obtained are readily dehydrated to give the corresponding trifluoromethyl vinyl aryl compounds, and the trifluoromethyl group is unaffected by the dehydration. Since the trichloromethyl group is very unstable under ordinary dehydrating conditions, the stability of the trifluoromethyl group in a dehydration such as that which is effected, for example, in the presence of alumina, is surprising.

Dehydration of the trifluoromethyl aryl methyl carbinols may be effected catalytically in either the liquid or the vapor phase. As catalysts I may employ generally inert masses of large surface such as Activated Alumina, activated charcoal, silica, silica gel, pumice, pumice impregnated with aluminum phosphate, activated earths, glass fragments, magnesium oxide, etc. Although the dehydrating step may be effected by simply refluxing in the liquid phase the carbinol in the presence of a catalyst, and if desired in the presence of a solvent or diluent, this method leads to the formation of some polymeric material. For optimum yields of the monomeric (trifluoromethyl) vinyl aryl compounds I prefer to conduct the dehydration in the vapor phase. The (trifluoromethyl) vinyl aryl carbinols may be vaporized and the vapors passed therefrom over and through the dehydrating catalysts. Better results are obtained by flashing the carbinols into a vapor by dropping upon a heated surface, in such a manner that the flash evaporation thereof takes place at pressures below atmospheric. When employing the flash evaporation procedure, pressures of from 30 mm. to 250 mm. pressure absolute, i. e., from $1/25$ to about $1/3$ of an atmosphere are preferably used, because more rapid flow is obtained thereby. Temperatures should be above 250° C., but below temperatures at which thermal cracking takes place. Temperatures in the neighborhood of from 290° C. to 320° C. have been found to give good yields of the (trifluoromethyl) vinyl aryl compounds.

The invention is further illustrated, but not limited, by the following example:

Example

*Preparation of meta-(trifluoromethyl)phenyl methyl carbinol:* A Grignard reagent was prepared by reaction of 326 g. of meta-bromobenzotrifluoride with 37 g. of magnesium in 350 cc. of dry ether. The reaction vessel containing the product was then immersed in a "dry-ice" bath and there was slowly added to it, with vigorous stirring and over a period of 1.75 hours, a mixture consisting of 66 g. of acetaldehyde in 80 cc. of dry ether. During addition of the acetaldehyde the temperature of the reaction mixture varied from 3° C. to 5° C. The product was then poured into about 1 kg. of ice and treated with about 400 cc. of 15% sulfuric acid. The water layer was extracted 3 times with ether, and subsequently part of the ether was removed from the extract by ordinary distillation. The rest of the ether was removed by lowering the pressure to 14 mm., at which pressure the carbinol was also distilled. The meta-(trifluoromethyl)-phenyl methyl carbinol which is thus obtained in about 80% yield has a boiling point of 97° C. at 14 mm., and redistillation of this gave a purer product, B. P. 99° C.–99.5° C. at 15 mm., $n_D^{25}$ 1.4560; $d_4^{25}$ 1.2369.

*Preparation of meta-(trifluoromethyl) styrene:* Dehydration of the above carbinol was effected by passing 479 g. (2.52 mol) of it over Activated Alumina at a temperature of 290° C.–300° C. and a pressure of from 65 to 75 mm. The equipment employed for this purpose comprised a silica tube having a length of about 2 feet and an internal diameter of 0.75 inch. The tube was packed with an Activated Alumina of about 4–8 mesh particle size and the carbinol was passed through it at the rate of about 2 drops per second. After the end of the run the reaction tube was washed with benzene and the benzene washings were added to the dehydration product. Separation of the reaction water was effected by means of a separatory funnel and the benzene was removed by distillation at reduced pressure. The meta-(trifluoromethyl)styrene was distilled at a temperature of 78° to 79° C. at a pressure of 57 mm. of mercury. It was obtained in a 79.0% yield. Redistillation gave a purer product, B. P. 76.2° C./55 mm., $n_D^{25}$ 1.4632; $d_4^{2}$ 1.1588. When cooled in liquid air the meta-(trifluoromethyl)styrene became viscous at a temperature of about −100° C. and solidified to a glass-like solid at lower temperatures.

Polymerization of the meta-(trifluoromethyl)-styrene was effected by maintaining it for a period of about 18 hours at a temperature of 105° C. in the absence of a catalyst of polymerization. The product was a hard, clear, colorless resin having a melting point of 195° C. and a decomposition point of 210° C. It was soluble in dioxane, ethanol, ethyl acetate, acetone, ethylene dichloride and 2-nitropropane and it was swollen by benzene, gasoline and carbon tetrachloride. Films of the resin prepared by casting solutions of the same were colorless, transparent products of very good flexibility and resistance to heat and sunlight.

Meta-(trifluoromethyl)styrene is particularly valuable as a copolymerizing agent in the preparation of readily milled, synthetic, rubbery materials.

Ortho-(trifluoromethyl)styrene and para-(trifluoromethyl)styrene are obtained by the procedure described above for the preparation of meta-(trifluoromethyl)styrene, employing ortho-bromobenzotrifluoride or para-bromobenzotrifluoride, respectively, instead of the meta-bromo compound for the preparation of the Grignard reagent.

Since bromination of benzotrifluoride yields, as the mono-bromo-substituent, the meta-bromo derivative exclusively, the preparation of ortho- and para-(trifluoromethyl)phenyl methyl carbinol from the Grignard reagent is complicated by the fact that the initial bromo compounds must be prepared indirectly. Ortho-bromo-benzotrifluoride is obtainable by the Sandmeyer reaction from the ortho-aminobenzotrifluoride reported by Rouche (Bull. sci. Acad. roy. Belg. 13, 346–57 (1927)). Para-bromobenzotrifluoride is obtainable by reducing Rouche's para-nitrobenzotrifluoride to the corresponding amino compound and then converting the para-aminobenzotrifluoride to the bromo compound by the Sandmeyer reaction.

While bromination of benzotrifluoride yields only the meta-bromo derivative, chlorination of benzotrifluoride yields large quantities of meta-chlorobenzotrifluoride, some ortho-chlorobenzotrifluoride and very small quantities of parachlorobenzotrifluoride. In order to avoid the necessity of preparing the ortho- and para-bromobenzotrifluorides by an indirect method, I have attempted to prepare the carbinols by using the corresponding chloro-compounds in making the Grignard reagents. While the (trifluoromethyl)phenyl magnesium chlorides were found to be useful in preparation of the (trifluoromethyl)phenyl methyl carbinols by reaction of the same with acetaldehyde, the carbinol-forming reaction does not take place so readily with the magnesium chlorides as it does with the magnesium bromides. That it does take place at all may be explained by the activating effect of the highly negative trifluoromethyl substituent.

The (trifluoromethyl)vinylnaphthalenes and the (trifluoromethyl)vinylbiphenyls are obtainable by the general procedure described above for the preparation of the (trifluoromethyl)styrenes.

Since from the foregoing description of the invention it will be apparent to those skilled in the art that various other embodiments of the invention may be made without departing from the spirit and scope thereof, it is to be understood that no limitations are intended except those which are specifically recited in the following claims:

What I claim is:

1. As a new product a compound of the general formula:

$$CH_2:CH.Ar.CF_3$$

wherein Ar is an aromatic hydrocarbon radical.

2. As a new product a compound of the general formula:

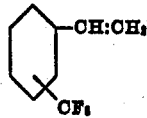

3. Meta-(trifluoromethyl)styrene.
4. Ortho-(trifluoromethyl)styrene.
5. Para-(trifluoromethyl)styrene.

6. A polymer of the compound defined in claim 1.
7. A polymer of the compound defined in claim 2.
8. Polymeric meta-(trifluoromethyl)styrene.
9. The process for the preparation of nuclearly substituted (trifluoromethyl) derivatives of vinyl aromatic hydrocarbons which comprises treating a compound of the general formula:

$$XMg.Ar.CF_3$$

wherein X is halogen and Ar is an aromatic hydrocarbon radical, with acetaldehyde to form a carbinol of the general formula:

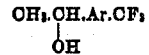

wherein Ar is an aromatic hydrocarbon radical, separating the carbinol so obtained and subjecting it to catalytic dehydration.

10. The process for the preparation of nuclearly substituted (trifluoromethyl) derivatives of styrene which comprises treating a compound of the general formula:

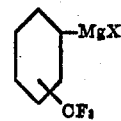

wherein X is halogen, with acetaldehyde to form a carbinol of the general formula:

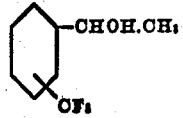

then separating the carbinol so obtained and subjecting it to catalytic dehydration.

MARY W. RENOLL.